United States Patent [19]
Giamati et al.

[11] Patent Number: 5,904,322
[45] Date of Patent: May 18, 1999

[54] HYBRID DEICER

[75] Inventors: Michael J. Giamati, Akron; David B. Sweet, Canal Fulton; Tommy M. Wilson, Jr., Stow, all of Ohio

[73] Assignee: The BFGoodrich Company, Richfield, Ohio

[21] Appl. No.: 08/838,213

[22] Filed: Apr. 16, 1997

Related U.S. Application Data

[60] Provisional application No. 60/035,864, Jan. 21, 1997.
[51] Int. Cl.$^6$ .................................................. B64D 15/12
[52] U.S. Cl. .................................. 244/134 B; 244/134 D
[58] Field of Search ........................... 244/134 R–134 D

[56] References Cited

U.S. PATENT DOCUMENTS

| | | | |
|---|---|---|---|
| 5,314,145 | 5/1994 | Rauckhorst, III | 244/134 A |
| 5,356,096 | 10/1994 | Rauckhorst, III et al. | 244/134 A |
| 5,547,150 | 8/1996 | Adams et al. | 244/134 R |
| 5,609,314 | 3/1997 | Rauckhorst, III et al. | 244/134 R |
| 5,657,952 | 8/1997 | Goldberg . | |

*Primary Examiner*—Galen L. Barefoot
*Attorney, Agent, or Firm*—Richard A. Romanchik

[57] ABSTRACT

A deicer comprises a skin heating means immediately subjacent an outer skin overlying an apex of a leading edge, and a skin deflection means immediately subjacent the outer skin chordwise aft of the apex. The skin heating means prevents the formation of ice over the apex and the skin deflection means deflects the outer skin to expulse ice formed chordwise aft of the apex.

14 Claims, 1 Drawing Sheet

HYBRID DEICER

This application claims benefit of U.S. Provisional Appln. 60/035,864 filed Jan. 21, 1997.

FIELD OF THE INVENTION

This invention relates to deicers that remove ice accumulated on various aircraft surfaces during flight in atmospheric icing conditions, and more particularly to deicers which utilize both dynamic motion to expel the ice and thermal energy to melt the ice.

BACKGROUND OF THE INVENTION

In recent years, many aircraft manufacturers have sought improved ice protection systems to enable aircraft to safely fly in atmospheric icing conditions. Ice accumulations on the leading edge surfaces of various aircraft structures can seriously effect the aerodynamic characteristics of an aircraft. Examples of such aircraft structures include wings, engine inlets, and horizontal and vertical stabilizers. A leading edge is that portion of a surface of a structure that functions to meet and break an airstream impinging upon the surface of an aircraft structure. The impinging airstream is induced during flight. Conventional pneumatic deicers, electrothermal deicers and bleed air anti-icers have been used for many years to protect the leading edges of general aviation or commercial aircraft. These ice protection techniques are described in detail by Technical Report ADS-4, Engineering Summary of Airframe Icing Technical Data published by the Federal Aviation Agency, December 1963. In spite of these proven techniques, many aircraft manufacturers and operators have expressed a desire for new systems having better ice removal performance, longer life and decreased weight and energy requirements. In particular, a deicer is desired exhibiting the excellent ice removal performance typical of the devices described above while having increased life, reduced weight, and reduced energy consumption.

SUMMARY OF THE INVENTION

The invention comprises a deicer adapted for attachment to a substructure, the deicer having an outer surface that meets and breaks an impinging airstream when attached to the substructure, the substructure having an apex corresponding to the portion of the deicer and substructure underlying the area of the outer surface where the radius of curvature is smallest, comprising:
a skin having deflectable regions;
skin deflection means disposed beneath a first area of said deflectable skin for deflecting said deflectable skin away from the substructure; and
an electrothermal means disposed beneath a second area of said skin,
wherein said electrothermal means melts ice overlying said second area and said skin deflection means deflects said deflectable skin at the deflectable regions.

DETAILED DESCRIPTION

Figure 1:
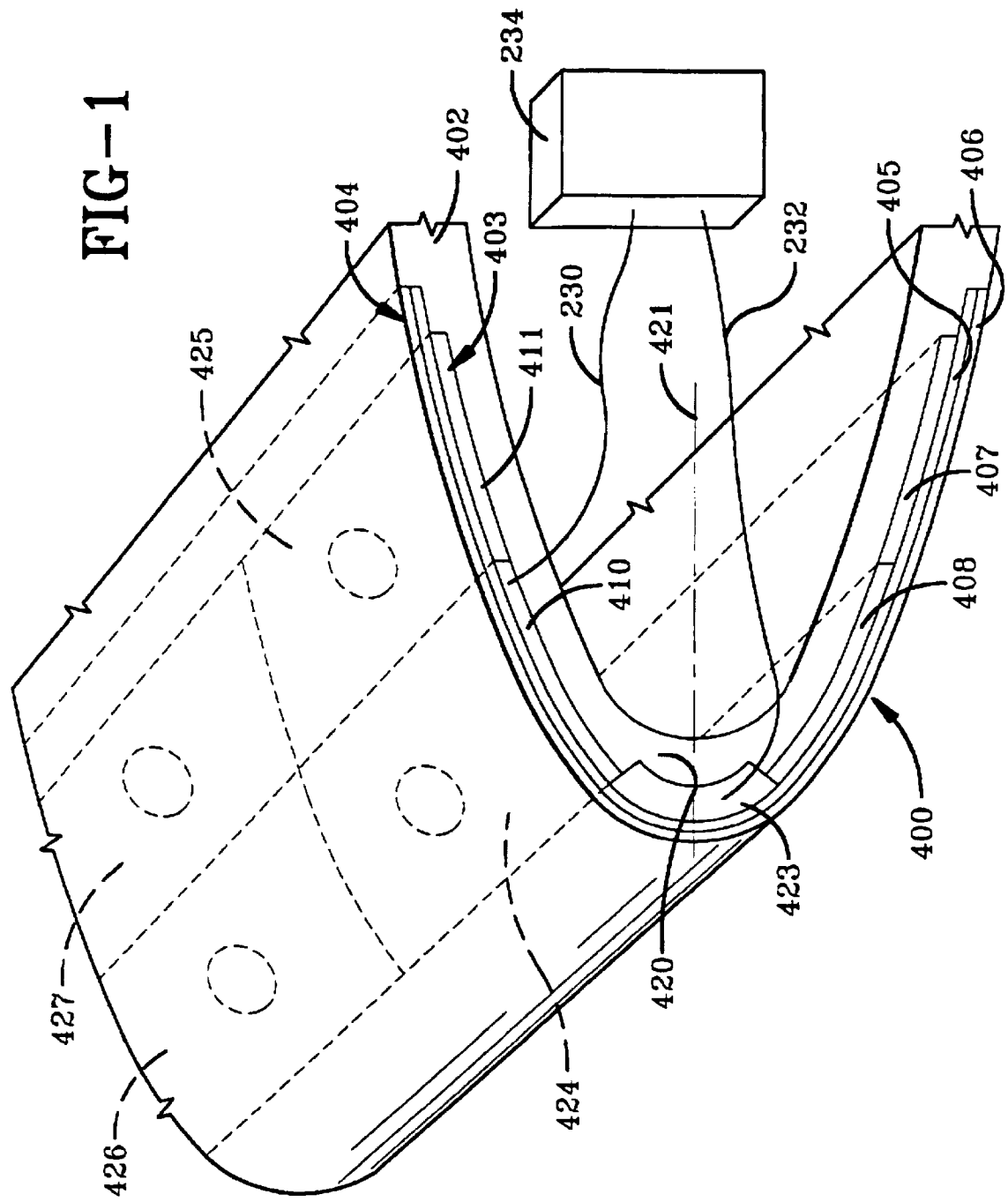
FIG. 1 is an isometric view of a deicer in accordance with the present invention.

Referring now to FIG. 1, a deicer 400 is shown attached to a substructure 402. Deicer 400 is comprised of a skin 404, skin deflection means 403, and a skin heating means 423. The substructure 402 and deicer have an apex 420 and are bisected by a centerline 421. The skin deflection means 403 of deicer 400 is comprised of several separation assemblies spaced along the span of deicer 400 underlying the skin 404. The active area of each separation assembly is defined by segments 424–427. Segments are similarly defined overlying the opposing portion of substructure 402 which are not in view as presented in FIG. 1. Separation assemblies 407–411 are spaced around the substructure 402 in the chordwise direction. Separation assemblies 411 and 410 abut along one edge of each separation assembly. Separation assembly 410 (and the coil within) abuts the skin heating means 423 along one edge. Separation assemblies 407 and 408 are similarly arranged overlying the opposing portion of substructure 402.

The skin deflection means are combined with the thin deflectable outer skin to form a unitary deicer. The unitary deicer is generally formed in a thin sheet that can be subsequently bonded to the leading edge surface of an existing aircraft structure. The deicer is usually designed to be removed from the aircraft structure and replaced in the field requiring the use of a replaceable adhesive such as 3M 1300L rubber cement. Examples are presented in U.S. Pat. No. 4,706,911 METHOD AND APPARATUS FOR DEICING A LEADING EDGE, Briscoe et al. (hereinafter referred to as the Pneumatic Impulse Patent), U.S. Pat. No. 4,875,644 ELECTRO-REPULSIVE SEPARATION SYSTEM FOR DEICING, Adams et al. (hereinafter referred to as the Electro-Repulsive Patent), U.S. Pat. No. 4,678,144 to Goehner et al., and U.S. Pat. No. 5,129,598 ATTACHABLE ELECTRO-IMPULSE Deicer, Adams et al. (hereinafter referred to as the Electro-Impulse Patents), the disclosures of which are fully incorporated herein by reference. In other devices, the skin deflection means are combined with the thin deflectable outer skin and a reinforcing structure thereby forming a unitary leading edge structure with integral de-icing capability. The deicer is permanently bonded to the reinforcing structure necessitating replacement of the entire assembly upon failure of the deicer. An example of this type of device is presented in U.S. Pat. No. 5,098,037 STRUCTURAL AIRFOIL HAVING INTEGRAL EXPULSIVE SYSTEM, Leffel et al. (hereinafter referred to as the Integral Expulsive System Patent), the disclosure of which is fully incorporated herein by reference. For the purposes of this application, the structure to which the deicer is attached will be referred to as the "substructure." Examples of substructures include an existing aircraft structure having a leading edge surface and a reinforcing structure as discussed above.

As mentioned previously, the skin deflection means can take a variety of forms. In the Electro-Repulsive Patent, the skin deflection means comprises an upper array of conductors and a lower array of conductors. The upper conductors are substantially parallel to each other and to adjacent conductors in the lower layer. The upper conductors are connected in series with the lower conductors so that a single continuous conductor is formed that passes from the upper layer, around the lower layer, back around the upper layer, and so on. Upon application of an electrical potential to the input leads, current is developed in the upper conductors that is in the same direction in all upper conductors. Likewise, current is developed in the lower conductors that is in the same direction in all lower conductors, but opposite to the direction of the current in the upper conductors. As explained in the Electro-Repulsive Patent, maintaining a constant current direction in all the conductors of a layer greatly increases the separation force between the two layers.

After installation of the deicer on a substructure, the upper and lower conductors are sandwiched between the structural member and a surface ply (the surface ply is analogous to a thin deflectable skin). Upon application of a high magnitude short duration current pulse, opposing electromagnetic fields in the upper and lower layers forcefully repel each other. This motion induces a dynamic motion into the surface ply which dynamically removes accumulated ice. As described in the Electro-Repulsive Patent, a current pulse that rises to between 2300 and 3100 amperes within 100 microseconds generates effective ice removal. A circuit for generating such a pulse is described in the Electro-Repulsive Patent. The circuit includes a pulse forming network, but this is not absolutely necessary.

Another form for the skin deflection means utilizing electromagnetic apparatus is illustrated by the Electro-Impulse Patents. A planar coil comprising at least one coiled conductor is sandwiched between a surface ply and a conductive substructure (such as the leading edge of an aluminum aircraft structure). Planar coils are described in great detail in U.S. Pat. No. 5,152,480 PLANAR COIL CONSTRUCTION, Adams et al. (hereinafter referred to as the Planar Coil Patent), the disclosure of which is fully incorporated herein by reference. As described in the Electro-Impulse Patent, a high magnitude short duration current pulse is applied to the coil. The current in the coil induces a strong rapidly changing electromagnetic field. The electromagnetic field generates eddy currents in the conductive substructure which, in turn, generates an opposing electromagnetic field. The two electromagnetic fields repel each other causing a repelling force between the coil and the substructure. The coil induces dynamic motion into the surface ply thereby dynamically removing accumulated ice. Effective ice removal is generated by a peak current of about 3000 amperes rising in a period of 100 microseconds. An electrical circuit for generating such a pulse is disclosed. The circuit is very similar to the circuit disclosed in the Electro-Repulsive Patent.

In the previous example, the skin deflection means is composed of a single unitary planar coil. A target may also be required if the substructure does not have sufficient electrical conductivity to effectively develop eddy currents. A target would be required with a fiber reinforced plastic substructure, or a conductive substructure that is too thin to effectively develop eddy currents. The target is a sheet of conductive material such as copper or aluminum that is located adjacent one surface of the coil. The coil and target are forcefully repelled from each other upon application of a high magnitude short duration current pulse to the coil due to opposing magnetic fields generated by current in the coil and by eddy currents in the target. This motion induces dynamic motion into the surface ply which dynamically removes accumulated ice. The target can be formed as a part of the substructure or can be formed as a part of the thin force and displacement generation means. Also, as described in the Electro-Impulse Patent, either the target or the coil can be located immediately subjacent the outer skin. The target applies the motive force to the skin if it is located subjacent the skin. Conversely, the coil applies the motive force to the skin if it is located subjacent the skin.

The Planar Coil Patent also teaches an electro-repulsive variation similar to the Electro-Repulsive Patent. Two mirror image unitary planar coils are superposed relative to each other and electrically connected so that upon application of a high magnitude short duration current pulse to each coil, current direction is opposite in each coil. Opposing electromagnetic fields are generated in the coils which causes each coil to forcefully repel the other. This motion induces a mechanical impulse into the surface ply which removes accumulated ice. This approach differs from the Electro-Repulsive Patent which utilizes a single conductor to form the upper and lower conductors.

Another form for the skin deflection means is an inductive coil such as those disclosed in the aforementioned Goehner et al. patent. Specifically, devices 407–411 may be comprised of coils available from Aero-Electric Corporation of Russia. These coils are preferably disposed beneath the airfoil skin and mounted to underlying airfoil spars or other substructure.

Primary electric current pulses provided via a line 230 from a controller 234 flow through the coil, thereby inducing eddy currents in the metal skin 404. The magnetic fields produced by the primary current and eddy currents interact so as to cause deformation of the skin 404.

Skin heating means 101 may be any of a number of electrothermal heating apparatus known to those in the skilled in the art. Examples of such heating means are presented in U.S. Pat. Nos. 2,599,059, 2,992,317, 5,351,918, 5,475,204 and U.S. Pat. No. 4,386,749, the disclosures of which are fully incorporated herein by reference.

Skin heating means 423 divides the skin deflection means, which are disposed adjacent the skin heating means. The substructure 402 provides the structural integrity necessary to absorb and resist flight loads and unexpected impacts with foreign objects. The substructure can be formed from a metal, such as aluminum, or fiber reinforced plastic materials that are commonly used on aircraft such as epoxy impregnated glass or graphite fabrics. The skin 404 includes a backing layer 405 and a layer of erosion resistant material 406. The backing layer 405 can be formed from fiber reinforced plastic material, such as nitrile phenolic or epoxy impregnated into a fabric composed of fibers belonging to one of a group including carbon fibers, glass fibers, and nylon fibers. The erosion layer 406 can be formed from rubber, metal, or plastic, such as neoprene, titanium foil, polyether-ether-ketone film, polyurethane film, and polyurethane paint depending on the application. The erosion layer 406 is necessary to provide resistance to impact from rain, sand, and other debris that would damage the backing layer 405. The skin 404 must have elastic properties. The term "elastic" refers to the tendency of a material to return entirely to its rest state within a short period of time after an imposed force is removed.

In operation, heat is continuously applied by heating means 423 once an icing condition is encountered, and a high magnitude current pulse is applied sequentially to the leads of each separation assembly. The separation assembly coils repel the skin away. Any ice accumulating over the heater will melt and the resulting water will run back and refreeze chordwise aft of the stagnation line 421. Skin deflection means 403 is periodically cycled to remove any such runback refreeze ice and any other ice that otherwise accumulates. If the heating means 423 is activated before the aircraft enters icing conditions, the heating means acts as an anti-icer and the cloud liquid droplets will remain in a liquid state upon impinging on the airfoil surface over the heating means and will run back and refreeze chordwise aft of the stagnation line 421.

It is to be noted that a skin deflection means is shown on only on both sides of the airfoil. It has been found that only deflection means on top of the airfoil may be necessary to effectively remove all ice from the airfoil, thereby saving cost in weight, energy and expense.

Though discussed in terms of individual separation assemblies, several separation assemblies could be formed into a single unitary blanket.

Although the invention has been described with reference to certain and preferred embodiments, including the best embodiments, it would be apparent to people skilled in the art of de-icing of aircraft that other variations are possible which are obvious thereover. There variations are intended to be included by the present specification and appended claims.

We claim:

1. A dynamic mechanical deicer adapted for attachment to a substructure, the deicer having an outer surface that meets and breaks an impinging airstream when attached to the substructure, the substructure having an apex corresponding to the portion of the deicer and substructure underlying the area of the outer surface where the radius of curvature is smallest, comprising:

a deflectable skin;

skin deflection means disposed beneath a first area of said deflectable skin for deflecting said deflectable skin away from the substructure; and a skin heating means disposed beneath said deflectable skin at the apex of the substructure, wherein said skin heating means heats said skin.

2. The deicer of claim 1 wherein said skin heating means divides said skin deflection means, said skin heating means being immediately subjacent said skin, and said skin deflection means abuts said skin heating means.

3. The deicer of claim 1, wherein said thin deflectable skin includes at least one layer of fiber reinforced plastic that selectively stiffens said skin in a predetermined area.

4. The deicer of claim 1, wherein said thin deflectable skin includes at least one layer of fabric impregnated with nitrile phenolic matrix, the fibers of said fabric layer belonging to one of a group including carbon fibers, glass fibers, nylon fibers, and Kevlar fibers.

5. The deicer of claim 1 wherein said skin deflection means comprises electromagnetic apparatus, said electromagnetic apparatus being of the type that utilizes a high magnitude short duration current pulse to develop opposing electromagnetic fields that cause said skin to be deflected from the substructure.

6. The deicer of claim 1 wherein said skin deflection means comprises electromagnetic apparatus, said electromagnetic apparatus being of the type that utilizes a high magnitude short duration current pulse to develop opposing electromagnetic fields that cause the skin to be deflected from the substructure.

7. The deicer of claim 1 wherein said skin deflection means comprises electromagnetic apparatus, said electromagnetic apparatus being of the type that utilizes a high magnitude short duration current pulse is applied to a coil which induces a strong rapidly changing electromagnetic field which generates eddy currents in a nearby conductive structure.

8. A dynamic mechanical deicer adapted for attachment to a substructure, the deicer having an outer surface that meets and breaks an impinging airstream when attached to the substructure, the substructure having an apex corresponding to the portion of the deicer and substructure underlying the area of the outer surface where the radius of curvature is smallest, comprising:

a deflectable skin;

a deflector disposed beneath a first area of the deflectable skin for deflecting the deflectable skin away from the substructure; and a heater disposed beneath the deflectable skin at the apex of the substructure, wherein the heater heats the skin.

9. The deicer of claim 8 wherein the heater divides the deflector, the heater being immediately subjacent the skin, and the deflector abuts the heater.

10. The deicer of claim 8, wherein the thin deflectable skin includes at least one layer of fiber reinforced plastic that selectively stiffens the skin in a predetermined area.

11. The deicer of claim 8, wherein the thin deflectable skin includes at least one layer of fabric impregnated with nitrile phenolic matrix, the fibers of the fabric layer belonging to one of a group including carbon fibers, glass fibers, nylon fibers, and Kevlar fibers.

12. The deicer of claim 8 wherein the deflector comprises electromagnetic apparatus, the electromagnetic apparatus being of the type that utilizes a high magnitude short duration current pulse to develop opposing electromagnetic fields that cause the skin to be deflected from the substructure.

13. The deicer of claim 8 wherein the deflector comprises an electro-repulsive apparatus being of the type that utilizes a high magnitude short duration current pulse to develop opposing electromagnetic fields in conductors carrying current in opposite directions.

14. The deicer of claim 8 wherein the deflector comprises an electro-impulse apparatus being of the type that utilizes a high magnitude short duration current pulse is applied to a coil which induces a strong rapidly changing electromagnetic field which generates eddy currents in a nearby conductive structure.

* * * * *